United States Patent
Waters et al.

(10) Patent No.: US 9,529,411 B2
(45) Date of Patent: Dec. 27, 2016

(54) POWER-SAVING MODE FOR USB POWER DELIVERY SOURCING DEVICE

(71) Applicant: Texas Instruments Incorporated, Dallas, TX (US)

(72) Inventors: Deric Wayne Waters, Dallas, TX (US); Martin Howard Patoka, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 144 days.

(21) Appl. No.: 14/526,061

(22) Filed: Oct. 28, 2014

(65) Prior Publication Data
US 2015/0362984 A1    Dec. 17, 2015

Related U.S. Application Data (60) Provisional application No. 62/011,720, filed on Jun. 13, 2014.

(51) Int. Cl.
G06F 1/26 (2006.01)
G06F 1/00 (2006.01)
G06F 1/32 (2006.01)

(52) U.S. Cl.
CPC ............ *G06F 1/3287* (2013.01); *G06F 1/266* (2013.01); *G06F 1/3206* (2013.01); *G06F 1/3215* (2013.01); *G06F 1/26* (2013.01); *Y02B 60/1228* (2013.01); *Y02B 60/1235* (2013.01)

(58) Field of Classification Search
CPC ..................................... G06F 1/26; G06F 1/32
See application file for complete search history.

(56) References Cited

U.S. PATENT DOCUMENTS

| | | | | |
|---|---|---|---|---|
| 2004/0251878 | A1* | 12/2004 | Veselic | H02J 7/00 320/141 |
| 2005/0039060 | A1 | 2/2005 | Okayasu | |
| 2008/0155143 | A1* | 6/2008 | Mochizuki | G06F 1/325 710/64 |
| 2010/0033018 | A1* | 2/2010 | Fukasawa | H02J 7/0036 307/80 |

(Continued)

OTHER PUBLICATIONS

"Universal Serial Bus Power Delivery Specification," Revision 1.0, Including Errata Through Mar. 11, 2014 (Version 1.3), Chapter 5, 27 pages pages.

(Continued)

*Primary Examiner* — Phil Nguyen
(74) *Attorney, Agent, or Firm* — William B. Kempler; Chares A. Brill; Frank D. Cimino (57) ABSTRACT

Methods of reducing power consumption in a USB power-delivery source device. In one such method, one or more source capabilities messages are sent by the USB power-delivery source device. If, after sending a source capabilities message, a response to said source capabilities message is not received within a predetermined time period, the device sends another source capabilities message. If, after sending a predetermined number of source capabilities messages, no response is received, the device waits an extended period of time before sending another source capabilities message. Receiving functionality of the USB power-delivery source device is turned off during some or all of said extended period of time.

9 Claims, 4 Drawing Sheets

(56) References Cited

U.S. PATENT DOCUMENTS

| | | | |
|---|---|---|---|
| 2010/0213876 A1* | 8/2010 | Adamson | H05B 37/0272 |
| | | | 315/312 |
| 2010/0219790 A1* | 9/2010 | Chadbourne | G06F 1/266 |
| | | | 320/107 |
| 2010/0298029 A1* | 11/2010 | Jang | G06F 1/266 |
| | | | 455/557 |
| 2011/0016334 A1* | 1/2011 | Tom | G06F 1/266 |
| | | | 713/300 |
| 2011/0178650 A1* | 7/2011 | Picco | H05B 37/0254 |
| | | | 700/295 |
| 2012/0078690 A1 | 3/2012 | Harriman et al. | |
| 2012/0215898 A1* | 8/2012 | Shah | H04L 65/1069 |
| | | | 709/223 |
| 2012/0246504 A1* | 9/2012 | Li | G06F 1/263 |
| | | | 713/324 |
| 2012/0297207 A1 | 11/2012 | Carlsen et al. | |
| 2013/0238819 A1* | 9/2013 | Oljaca | G06F 13/4081 |
| | | | 710/15 |
| 2013/0268789 A1* | 10/2013 | Yang | G06F 1/3278 |
| | | | 713/323 |
| 2013/0290765 A1 | 10/2013 | Waters et al. | |

OTHER PUBLICATIONS

Search Report for PCT Application No. PCT/US15/35897, mailed Nov. 26, 2015 (1 page).

\* cited by examiner

POWER-SAVING MODE FOR USB POWER DELIVERY SOURCING DEVICE

BACKGROUND

Universal Serial Bus (USB) is an industry standard that defines the cables, connectors and communications protocols used in a bus for connection, communication, and power supply between computers and electronic devices. USB was designed to standardize the connection of computer peripherals (including keyboards, pointing devices, digital cameras, printers, portable media players, disk drives and network adapters) to personal computers, both to communicate and to supply electric power. It has become commonplace on other devices, such as smartphones, PDAs and video game consoles. USB has effectively replaced a variety of earlier interfaces, such as serial and parallel ports, as well as separate power chargers for portable devices.

A new USB Power Delivery Specification is under development to enable delivery of higher power over new USB cables and connectors. This technology creates a universal power plug for laptops, tablets, etc. that may require more than five volts using cables and plugs compatible with existing USB solutions. The USB Power Delivery (USB-PD) Specification defines a communication link between ports connected via a USB-PD cable and USB-PD connectors. The communication is designed to be half-duplex and packet-based. The packets contain information that enables the two ports to communicate and negotiate the voltage and current the source port will provide to the sink port. The ports can also negotiate to switch roles (source to sink and vice versa). The underlying communication in the USB-PD specification can use binary frequency-shift keying (FSK) or biphase mark coding (BMC). This communication happens independently from the normal USB communications that appear on data wires such as D+ and D− per the USB standard. The USB-PD communication goes over a different wire (e.g., the Vbus or CC wire) rather than the USB data wires.

In USB power delivery (PD) there are four kinds of devices defined: provider-only, provider/consumer, consumer/provider, and consumer-only. Devices that are provider-only, provider/consumer, or consumer/provider may sometimes act in a source role—meaning they are providing DC voltage on the Vbus wire for the far-end device to consume or sink. This disclosure is relevant for provider-only, provider/consumer and consumer/provider USB-PD devices that are acting in a source role. The provision of power by a USB-PD source device to a consuming device over a USB cable consumes appreciable amounts of power in the USB-PD source device. Thus it would be beneficial to implement power-saving measures in such devices.

SUMMARY

One embodiment of the present invention is directed to a method of operating a USB power-delivery source device. Pursuant to said method, one or more source capabilities messages are sent by the USB power-delivery source device. If, after sending a source capabilities message, a response to said source capabilities message is not received within a predetermined time period, the device sends another source capabilities message. If, after sending a predetermined number of source capabilities messages, no response is received, the device waits an extended period of time before sending another source capabilities message. Receiving functionality of the USB power-delivery source device is turned off during some or all of said extended period of time.

Another embodiment of the invention is directed to a method of operating a USB power-delivery source device. Pursuant to this method, the USB power-delivery source device communicates with a second USB power-delivery device. Said communicating includes receiving messages from the second USB power-delivery device. If no messages are received from the second USB power-delivery device for a predetermined duration, the USB power-delivery device enters a device sleep mode wherein signal-receiving functionality of the device is turned off.

Another embodiment of the invention is directed to a method of operating a USB power-delivery source device. Pursuant to said method, the USB power-delivery source device sends one or more abbreviated source capabilities messages. Each abbreviated source capabilities message contains only one power delivery object. After the sending of each abbreviated source capabilities message, the device waits, for a predetermined length of time, to receive a response to said abbreviated source capabilities message. When a response to an abbreviated source capabilities message is received, the device sends a full source capabilities message comprising a plurality of power delivery objects.

DETAILED DESCRIPTION

This disclosure is directed generally towards power-saving modes for USB power-delivery sourcing devices.

Figure 1:
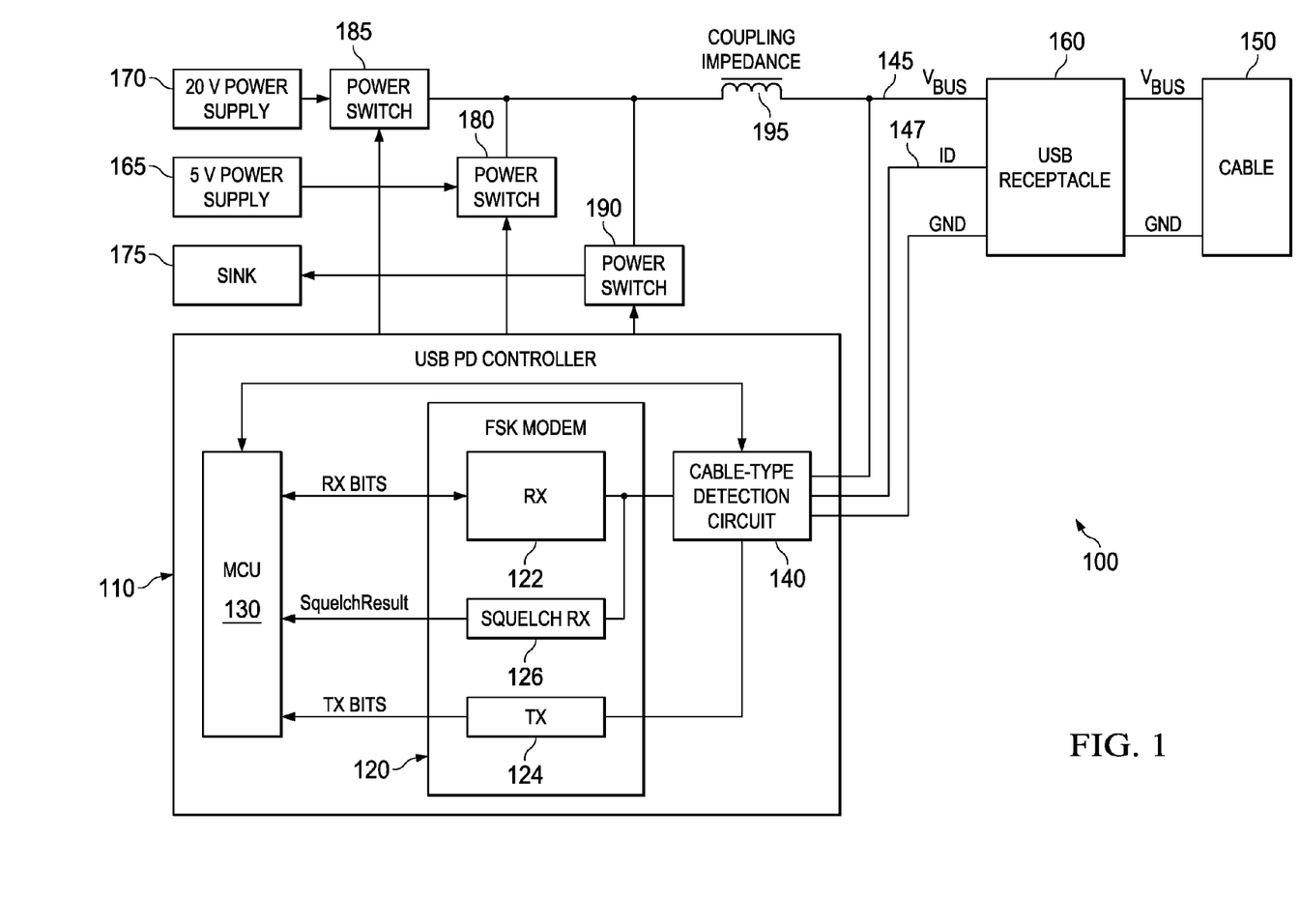
FIG. 1 is a block diagram showing aspects of a USB power-delivery device that are relevant to power delivery.

FIG. 1 is a block diagram showing aspects of a USB power-delivery device 100 that are relevant to power delivery. The device 100 of FIG. 1 can either source or sink power and therefore can function as either a provider or consumer USB power-delivery device. It will be understood that the methods and functionality of some embodiments of the present invention also pertain to source devices that can provide power to other USB devices but that cannot receive power from other USB devices. The USB power-delivery device 100 includes a USB receptacle 160 that is capable of attachably receiving a USB connector disposed on one end of a USB cable 150, as is well known in the art. The other end of the USB cable can be permanently attached to a second USB device, or can terminate at a second USB connector that can be attachably connected to a second USB-capable device. In either case, such second USB device will at times be referred to herein as the far-end device. In still another embodiment, the USB cable 150 can be permanently affixed to the USB device 100. The USB power-delivery device 100 also includes a USB-PD controller 110 that controls the communications with other USB power delivery devices, via the USB cable 150, regarding power delivery, and also controls the actual sourcing of power to, or sinking of power received from, another USB power delivery device.

The USB-PD controller 110 includes a frequency-shift keying (FSK) modem 120, a microcontroller unit 130, and a cable-type detection circuit 140. The FSK modem 120 includes an FSK receiver 122, an FSK transmitter 124, and a squelch receiver 126. It will be appreciated that the embodiment of FIG. 1 is merely illustrative and that the USB-PD modem 120 (and therefore its main receiver 122 and transmitter 124) can employ other modulation schemes other than frequency-shift keying in accordance with embodiments of the present invention, such as biphase mark coding (BMC). The FSK receiver 122 receives communications regarding USB power delivery from a far-end USB power-delivery device. The FSK transmitter 124 transmits communications regarding USB power delivery to a far-end USB power-delivery device. Such communications regarding USB power delivery can include the negotiating of which device is to be the source (provide power) and which is to be the sink (receive power), and the negotiating of the voltage, current, and mode of the power delivery, as well as other information attendant to the delivery of power from one device to the other over the USB cable 150. Together, the FSK receiver 122 and the FSK transmitter 124 may at times herein be referred to as the FSK transceiver. The FSK transceiver 122/124 communicates with the far-end USB device via the voltage bus (Vbus) 145. The FSK modem 120 shown in FIG. 1 also includes a squelch receiver 126. The squelch receiver 126 is a low-power receiver that can be left on, at times when the main FSK receiver 122 is turned off, in order to detect the arrival of packets from a far-end USB device. After the squelch receiver 126 detects the arrival of a packet, the microcontroller unit 130 can turn on the FSK receiver 122 to resume normal operation of the FSK modem 120. The microcontroller unit 130 controls the operations of the USB-PD controller 110, generates messages, regarding USB power delivery, to be sent to the far-end USB device, and processes messages regarding USB power delivery received from the far-end USB device. The USB-PD controller 110 also includes a cable-type detection circuit 140 that receives a cable identification signal 147 from the USB receptacle 160. Based on the cable identification signal 147 received from the USB receptacle 160, the cable-type detection circuit determines whether a cable is inserted in the USB receptacle 160 and, if so, what type of cable it is. This information is provided to the microcontroller unit 130, which can use the information, among other things, in determining what power delivery mode or modes are appropriate for the given USB cable type. In some embodiments the ID wire 147 may actually be two separate wires commonly known as CC1 and CC2 in a Type-C USB connector. Additionally, in some embodiments, cable-type information can also be provided to the cable-type detection circuit 140 via the Vbus 145.

The USB power-delivery device 100 shown in FIG. 1 also includes two power supplies: 5-volt power supply 165 and 20-volt power supply 170. It will be appreciated that this embodiment is merely illustrative and that the USB power-delivery device 100 can include additional power supplies as well, or a single power supply whose voltage can be changed. The USB power-delivery device 100 also includes a power sink 175 that can receive power supplied over the Vbus 145 to power the USB power-delivery device 100. The USB power-delivery device 100 further includes power switches 180, 185, 190. The USB-PD controller 110 controls the power switches 180, 185, 190 in order to select a power supply and to couple the selected power supply to the Vbus 145 through the coupling impedance 195, or to couple the power sink 175 to the Vbus 145 if the USB power-delivery device 100 is to receive power from a far-end device. In some embodiments the coupling impedance 195 may not be present.

Figure 2:
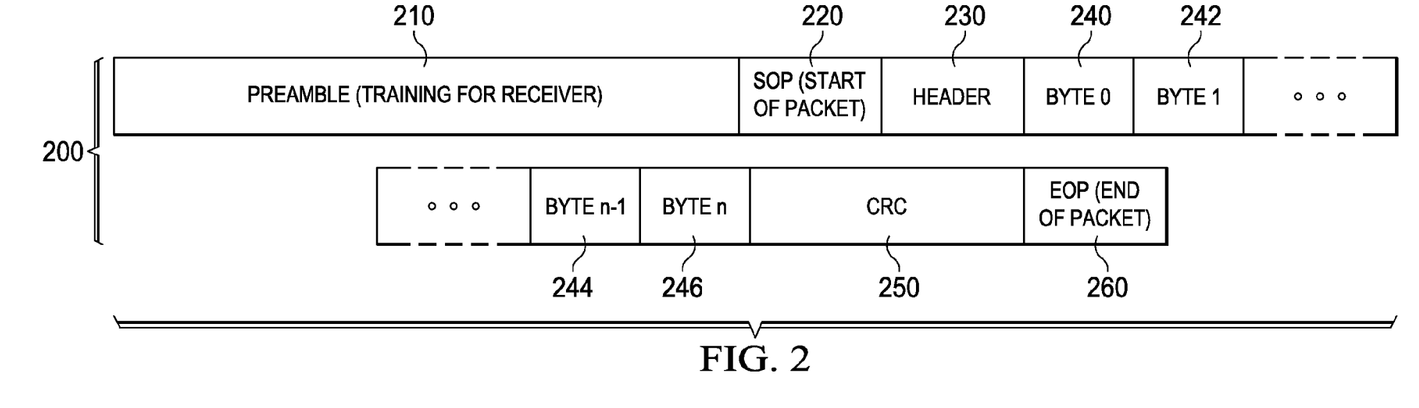
FIG. 2 is a data structure diagram representing a USB power-delivery data packet.

There is a physical layer built around the FSK transceiver 122/124 that allows the USB power-delivery device 100 and a far-end USB device to send power-delivery messages to one another over Vbus 145. Above the physical layer is a protocol layer, and then a policy engine layer. The physical layer uses binary frequency shift keying (FSK) modulation or biphase mark coding (BMC). The physical layer also encodes the some bits in the packet using, for example, 4b5b encoding. The packet format of a power-delivery data packet, according to an illustrative embodiment, is shown in FIG. 2. Each packet 200 begins with a preamble 210 which contains a sequence of alternating ones and zeros for a total of 64 bits. The preamble 210 is followed by a start-of-packet delimiter (SOP) 220, which is a predefined 20-bit code word that announces the start of a new data packet. The SOP 220 is followed by a header (that is encoded using the 4b5b code) which contains information used by the protocol layer. Among other information contained in the header 230 is a message-type field that indicates what kind of message the packet 200 represents. The header 230 also includes a data field (sometimes referred to as Nobj) that indicates the number of data objects that follow in the packet. In a specific type of message known as a source capabilities message, following the header 230 are one or more data fields, encoded using the 4b5b code, known as power delivery objects (PDOs). The source capabilities message is discussed further below. The power delivery objects are followed by a 32-bit cyclic redundancy check (CRC) 250. The CRC 250 is an error-detecting code used to detect accidental changes to the data contained in the data packet 200. The CRC is computed based on the header 230 and the power delivery objects. The CRC is the 32-bit remainder of a polynomial division of the contents of the header 230 and the power delivery objects, encoded into 40 bits using the 4b5b code. Upon retrieval of the data packet by, say, a second USB device, the calculation is repeated, and corrective action can be taken against presumed data corruption if the check values do not match. Finally, the CRC 250 is followed by a predefined 5-bit end-of-packet delimiter (EOP) announcing the end of the data packet 200.

The source capabilities message is a message that is sent by a USB-PD source device such as device 100 to broadcast its availability as a power source. The source capabilities message is a packet containing information about the device's capabilities as a source. Each source capabilities message includes one or more power delivery objects: one for each supply type that the device is cable of providing. Each power delivery object comprises multiple data fields, each indicating a different parameter of the associated voltage supply type. In the illustrative packet structure shown in FIG. 2, byte 0 240, byte 1 242, byte n−1 244, and byte n 246 make up one or more power delivery objects of data packet 200. In an illustrative embodiment, each power delivery object comprises 4 bytes (32 bits). Among these 32 bits are multiple bit fields of varying bit-lengths. For example, a first bit field of each power delivery object specifies the type of power supply, i.e., fixed-voltage, variable-voltage, or battery. A second bit field of each power delivery object specifies the fixed voltage or minimum voltage that the associated power supply can provide to the Vbus 145. A third bit field of each power delivery object specifies the maximum current or power that the associated power supply can source. For variable or battery power supplies, a fourth bit field contains the maximum voltage that the associated power supply can provide to the Vbus 145. For fixed-voltage power supplies, a fourth bit field of the power delivery object specifies the peak current that the fixed-voltage power supply can deliver. The peak current field tells the far-end (sinking) device whether it can source a higher current for a relatively short duration, and, if so, how much higher the current can go, and for how long that higher current level can be sustained. The first power delivery object of each source capabilities message is associated with a fixed-voltage power supply. This first power delivery object includes additional bit fields pertaining to dual-role power, USB suspend support, external power, USB communications capability, and data role swapping.

A GoodCRC message is a control message that is sent by a far-end USB power-delivery device in response to a source capabilities message sent by a USB power-delivery source device such as USB-PD source device 100. The GoodCRC message indicates that the source capabilities message has been received and that CRC check values matched. The GoodCRC message has the same frame format as the source capabilities message, but does not contain any power delivery objects. Thus the Nobj field in the header, which indicates the number of data objects in the packet, is zero. The message-type field in the header has a unique value that identifies the message as a GoodCRC message.

The first sign that a USB sourcing device is active is that a DC voltage (for example 5V) is detected on the Vbus wire. Devices at the far end of the cable (such as a mouse) can use this voltage to operate. In most cases, the first sign that the sourcing device is a USB-PD cable source is that the FSK modem 120 sends the source capabilities message over the Vbus wire 145 (to which it is capacitively coupled in most embodiments). In alternative embodiments, a BMC modem may send the message over the CC wire. When there is not a USB-PD partner device connected at the far end of the cable, the FSK modem receiver 122 will not receive any response signal. When a signal is sent without a response, the USB-PD protocol layer will trigger two retries, where a retry means the same packet will be sent again. If a response is received in a timely manner after a transmission, then the next retry is not sent.

Figure 3:
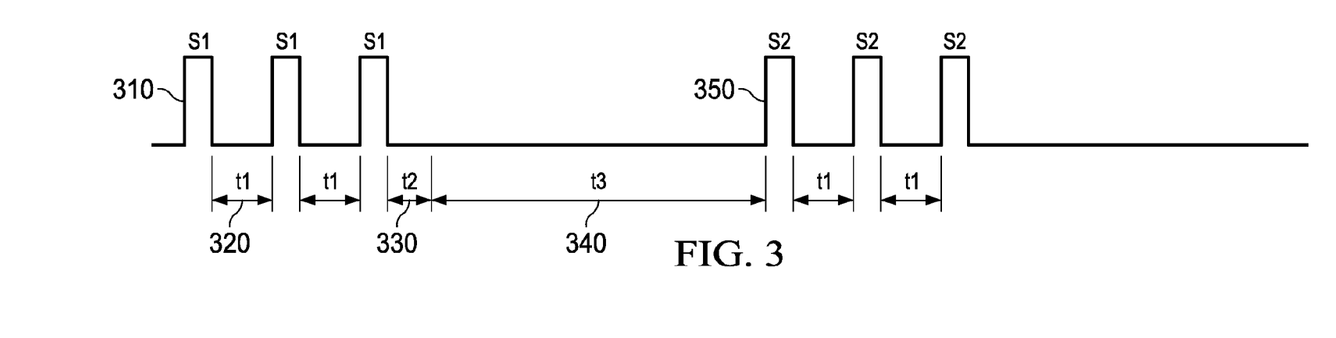
FIG. 3 is a timing diagram depicting the transmission of source capabilities messages by USB power-delivery source device.

FIG. 3 is a timing diagram illustrating how the packets can be observed coming out of the FSK transmitter 124 onto the Vbus wire 145 (or CC wire). S1 310 represents the first source capabilities message created at the policy engine layer. After transmitting S1, the FSK receiver 122 listens for a response and re-sends the packet after a time t1 320 elapses if a valid GoodCRC message is not received in response. After sending the S1 message 310 a total of three times and waiting for a time t2 330 after the third transmission, the protocol layer reports to the policy engine that there was a sending failure. The policy engine will then wait for an extended time t3 340 before sending another source capabilities message S2 350 to the protocol layer for transmission. In most cases the data in S1 and S2 are the same, although they could be different, for example, if the sourcing capabilities of the device have changed in the meantime. This process can be repeated without end, or the USB-PD source device 100 can stop sending source capabilities messages after a large number, such as, for example, 150, have been sent.

The USB Power Delivery Specification provides a method to detect when a cable is inserted into the device's receptacle in some cases. In such a case, if there is no cable inserted, the USB-PD device, such as device 100, may go into a lowest power mode to reduce the amount of power it consumes. In this lowest power mode, the sourcing device need not even apply any DC voltage to the Vbus wire 145 since there is no plug inserted. Then when it detects that a cable is inserted, the sourcing device 100 can start applying DC voltage to Vbus and continue (or begin) normal source operations. Whenever a cable 150 is inserted in the receptacle 160, the USB power-delivery source device 100 provides a DC voltage (generally 5V) to Vbus 145. However, it could happen that a cable is inserted in the receptacle (or the cable 150 may be permanently attached to device 100), but the other end of the cable is not connected to any device. The USB Power Delivery 1.0 Specification does not provide a means to detect this situation. In this situation, the sourcing device 100 applies a DC voltage to Vbus 145 as if there is a partner device connected at the far end of the cable. Embodiments of the present invention provide a low-power mode the source 100 may use in this scenario to reduce its power consumption.

According to the USB Power Delivery Specification, USB power-delivery devices are to be able to react immediately if a far-end partner device sends a message even within the interval labelled t3 340 in FIG. 3. Also, the sourcing USB-PD device, such as device 100, is required to maintain DC voltage on Vbus 145 throughout this process.

According to an illustrative embodiment of the present invention, the FSK receiver 122 is turned off during the interval labelled as t3 340 in FIG. 3. In one embodiment, the squelch receiver 126 is also turned off during this time period. In certain embodiments, other portions of the USB power-delivery device 100 are also turned off during t3. These measures allow the USB power-delivery device 100 to reduce its power consumption. This low-power mode is referred to herein as device sleep. Because the device's receiver 122 is disabled during the t3 interval, the device 100 doesn't waste power by running the receiver at times when there is a cable inserted with no USB-PD device attached at its far-end. The USB-PD source device 100 continues applying DC voltage (e.g., 5V) to Vbus 145 during t3 while the device 100 is in device sleep mode, as is required by the USB Power Delivery Specification whenever there is a USB cable 150 coupled to the receptacle 160. If the USB-PD device 100 has some other pending task(s) that need to be serviced during a t3 interval, in one embodiment the squelch receiver 126 can be left enabled while the other pending task(s) are handled.

Figure 4:
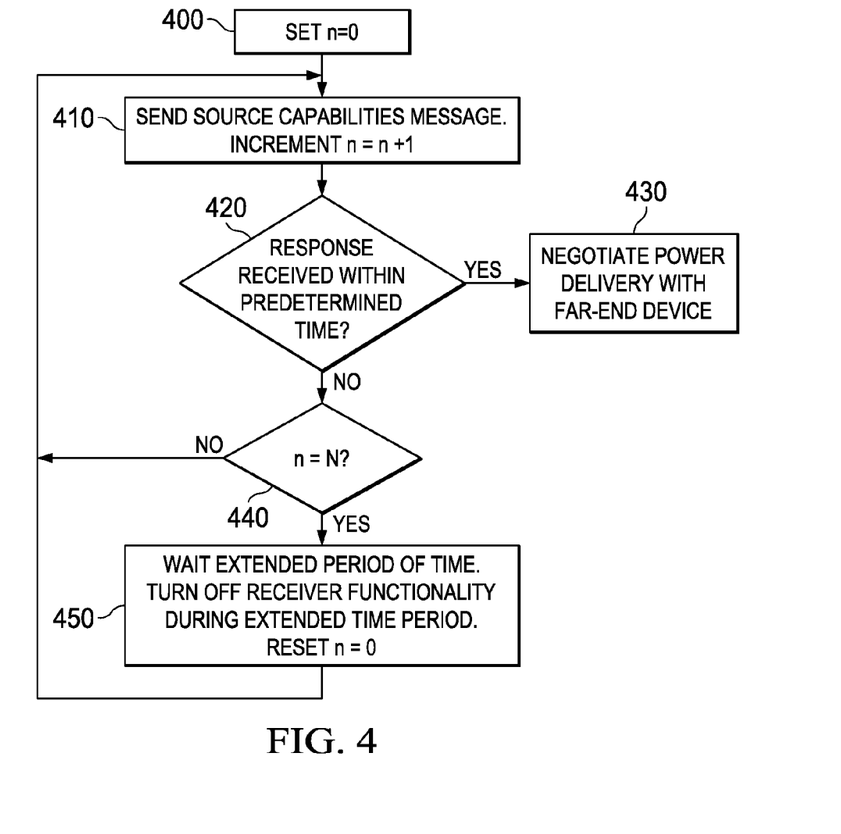
FIG. 4 is a flowchart representing a method of employing a device sleep mode in a USB power-delivery source device in order to reduce power consumption.

FIG. 4 is a flowchart representing a method of employing a device sleep mode in a USB power-delivery source device in order to minimize power consumption. At block 400, a variable n representing the number of source capabilities messages sent is set at zero. At block 410, a USB power-delivery source device, such as device 100 in FIG. 1, sends a source capabilities message over the Vbus 145, and n is therefore incremented. At decision block 420, it is determined whether a response to the source capabilities has been received within a predetermined time period after sending the source capabilities message. In an illustrative embodiment, this predetermined length of time is represented by the t1 interval 320 shown in FIG. 3. In one embodiment, the length of time t2 330 that is waited after the sending of the third source capabilities message is not identical to the length of time t1 that is waited after the sending of the first two source capabilities messages, as shown in FIG. 3. In any event, if a response to a source capabilities message is received within the predetermined time period, the USB-PD source device 100 negotiates with the far-end device that sent the response regarding power delivery, as shown at block 430. If this negotiation results in an agreement regarding power delivery, the USB-PD source device 100 will commence the delivery of power to the far-end device using an agreed upon power delivery mode. If, on the other hand, no response to the source capabilities message is received within the predetermined amount of time, it is determined whether a predetermined number N of source capabilities messages have been sent, as indicated at decision block 440. In an illustrative embodiment, N is 3, as described with respect to FIG. 3. In this embodiment, if n≠3, the device has not yet sent three source capabilities messages and therefore the process returns to block 410, where another source capabilities message is sent and n is incremented again. If, on the other hand, n is equal to N at decision block 440, the predetermined number of source capabilities messages have been sent. In that event, as indicated in block 450, the USB-PD source device waits for an extended period of time, represented by t3 in FIG. 3. During this extended period of time, the USB-PD source device, such as device 100, enters a device sleep mode wherein signal-receiving functionality of the USB-PD source device is turned off. For example, in one embodiment, the main receiver 122 of the USB-PD controller 110 is turned off during the extended time period t3. Also, in one embodiment, the squelch receiver 126 is turned off during this time period as well, and in certain embodiments, other portions of the USB power-delivery device 100 are also turned off. Also at block 450, the variable n is reset to zero before the USB-PD source device begins transmitting a new round of source capabilities messages starting at block 410.

While in the device sleep mode, the clock that the USB power-delivery source device 100 uses to determine when it needs to wake up and prepare to send the next source capabilities message might not be as accurate as when the device 100 is in normal operation. Also, while in device sleep mode, the device 100 will not receive any messages sent to it by a USB-PD device at the far end of the cable. This characteristic of device sleep means that any USB-PD device that uses this device sleep mode will not be fully compliant with the USB Power Delivery Specification. However, the device will still be fully functional and interoperable with other USB power-delivery devices.

In one embodiment of a USB power-delivery source device, in addition to entering the device sleep mode during the time interval t3 shown in FIG. 3, the device also uses a longer t3 time period than that called for in the USB Power Delivery Specification. This further reduces power consumption. If a USB-PD sinking device is connected at the far-end of the cable 150, it will wait for a time $t_{SinkWaitCap}$ for a source capabilities message to arrive. If it does not arrive, the far-end sinking device will send a hard reset message, wait again for $t_{SinkWaitCap}$, and send another hard reset message, wait again for $t_{SinkWaitCap}$, and then send yet another hard reset message. After this, in one embodiment, the sinking device will assume that the source is non-responsive. The time $t_{SinkWaitCap}$ is defined in the USB Power Delivery Specification. Therefore, in one embodiment, the USB-PD source device uses an extended t3 time period but keeps it below $3*t_{SinkWaitCap}$ so as to avoid being classified as non-responsive, which could cause interoperability problems.

In another embodiment of the present invention, the USB power-delivery source device 100 sends out an abbreviated source capabilities message until the first time it receives a GoodCRC message. This minimizes the duration of the S1 interval shown in FIG. 3 and further reduces power consumption. In one embodiment, the sourcing device 100 sends a source capabilities message containing only one power delivery object until it receives a GoodCRC message. After receiving the GoodCRC message, the sourcing device 100 sends another source capabilities message that includes a full complement of power delivery objects. The actual number of power delivery objects included in this subsequent source capabilities message will depend on the number of power supply types the device is capable of providing. In one embodiment, the single power delivery object included in the abbreviated source capabilities message is the power delivery object associated with the fixed 5-volt supply that is required to be included in all USB-PD sourcing devices.

Figure 5:
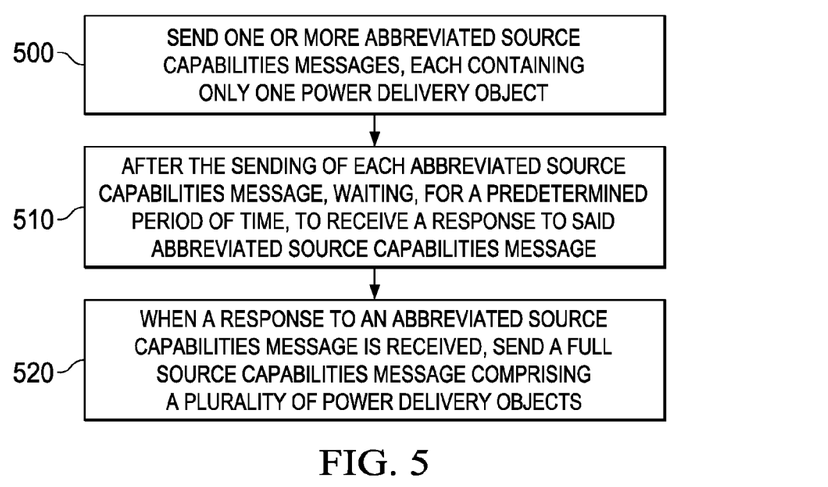
FIG. 5 is a flowchart representing a method of using abbreviated source capabilities messages in a USB power-delivery source device in order to reduce power consumption.

FIG. 5 is a flowchart representing a method of using abbreviated source capabilities messages in a USB power-delivery source device in order to minimize power consumption. At block 500, the device sends one or more abbreviated source capabilities messages over the Vbus 145. In one embodiment, the abbreviated source capabilities message contains only power delivery object. At block 510, after the sending of each abbreviated source capabilities message, the USB-PD source device waits, for a predetermined length of time, to receive a response to said abbreviated source capabilities message. At block 520, if the USB-PD source device receives a response to an abbreviated source capabilities message, the source device sends a full source capabilities message, which, in one embodiment, comprises a plurality of power delivery objects.

Figure 6:
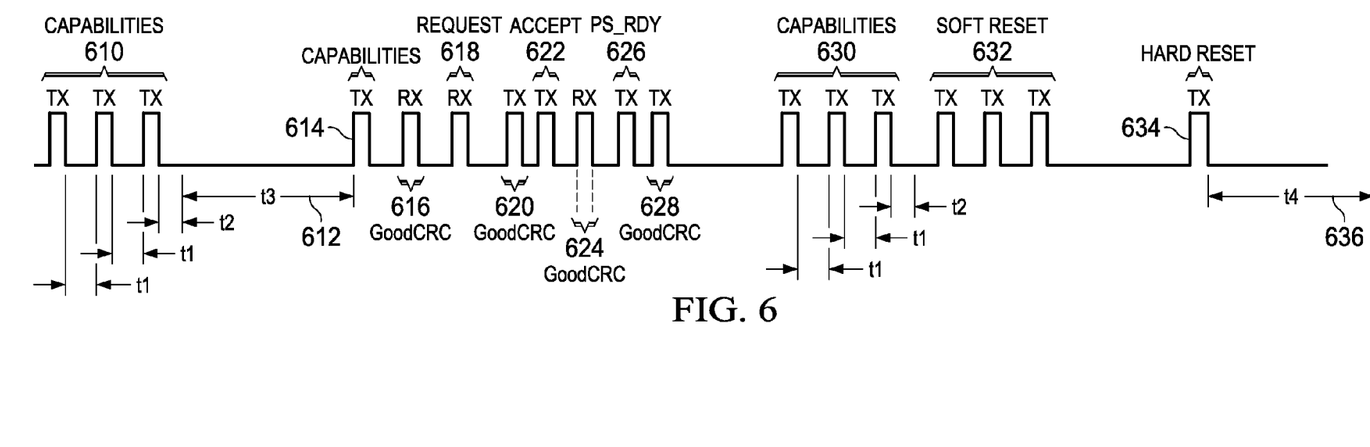
FIG. 6 is a timing diagram depicting the transmission and reception of various messages by a USB power-delivery source device.

In another embodiment of the present invention, once the USB power-delivery source device 100 has received a GoodCRC message, or any other valid USB-PD message, it will not start using the device sleep mode again until the communication stops for a period of time. But if the far-end device is unplugged, and therefore stops sending any USB-PD messages for a period of time, the USB-PD sourcing device 100 returns to using the device sleep mode described herein to save power. FIG. 6 is a timing diagram illustrating an example of the transmission and reception of data packets by the FSK transceiver 124/122 in such a situation. FIG. 6 shows the transmission of three source capabilities messages 610 with no response, followed by the extended time period t3 612 during which no source capabilities messages are sent and during which the USB-PD source device 100 enters a device sleep mode wherein it shuts down its receiver 122, as described above with respect to FIG. 3. The USB-PD source device 100 wakes up again to send another source capabilities message 614. By this point in time, a USB-PD device has been connected at the far end of the cable 150 and this far-end device responds to the source capabilities message 614 with a GoodCRC message 616, and then there is an exchange of messages. The far-end device sends a power request message 618, and the successful receipt of the request message 618 is acknowledged by the USB-PD source device 100 with GoodCRC message 620. The USB-PD source device 100 then indicates its acceptance of the power request with an accept message 622. The receipt of this accept message is acknowledged by the far-end USB-PD device with GoodCRC message 624. The USB-PD source device 100 then sends a power-source ready message 626 to indicate that it is ready to provide power and the far-end device acknowledges receipt of the power-source ready message 626 with a GoodCRC message 628. However, after sending the GoodCRC message 628, the far-end device gets unplugged or otherwise becomes unresponsive, and therefore never responds to the source capabilities messages 630.

After some predetermined amount of time of not hearing from the far-end device, the USB-PD source device 100 may send a source capabilities messages (or another type of message), as shown at 630 in FIG. 6. If three source capabilities messages 630 are sent with no response, the USB-PD source device 100 then attempts a soft reset by sending a soft reset message. A soft reset message, as defined in the USB Power Delivery Specification, is used to recover from protocol layer errors. A soft reset puts the message counters in a known state in order to regain message synchronization. The soft reset does not change the power being delivered; it is an attempt to fix a protocol error without affecting the power system. The soft reset message may be resent two more times if no response is received from the far-end device. If no response is received after three soft reset attempts, the USB-PD source device 100 waits for a time $t_{HardReset}$ (defined by the USB Power Delivery Specification), and then sends a hard reset message. A hard reset takes the voltage on Vbus 145 to below 0.8V to force a reset of the system. According to an illustrative embodiment of the present invention, after the USB-PD source device 100 sends the hard reset message 634, it goes into the device sleep mode during the time period t4 636 shown in FIG. 6.

Figure 7:
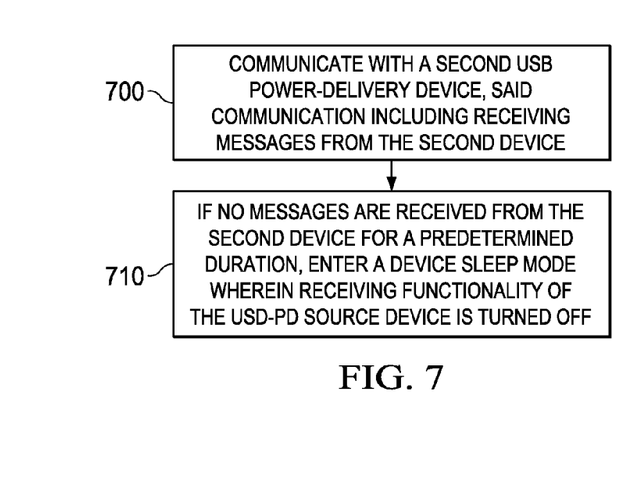
FIG. 7 is a flowchart representing a method of employing a device sleep mode in a USB power-delivery source device in order to reduce power consumption.

FIG. 7 is a flowchart representing a method of employing a device sleep mode in a USB power-delivery source device in order to minimize power consumption. At block 700, a USB power-delivery device, such as device 100 of FIG. 1, communicates with a second (far-end) USB power-delivery device over Vbus 145. This communication includes the transmission of messages to, and the receiving of messages from, the second USB power-delivery device. At block 710, if no messages are received from the second USB power-delivery device for a predetermined duration, the USB-PD source device 100 enters a device sleep mode wherein signal-receiving functionality of the USB power-delivery source device 100 is turned off.

Having thus described circuits and methods for implementing power-saving modes for USB power-delivery sourcing devices by reference to certain of their preferred embodiments, it is noted that the embodiments disclosed are illustrative rather than limiting in nature and that a wide range of variations, modifications, changes, and substitutions are contemplated in the foregoing disclosure. For example, while the USB-PD modem 120 (and therefore its main receiver 122 and transmitter 124) are described as using a frequency-shift keying (FSK) modulation scheme, it will be understood that these elements can employ other signal modulation schemes other than frequency-shift keying. Furthermore, in some instances, some features may be employed without a corresponding use of the other features. Accordingly, it is appropriate that the appended claims be construed broadly and in a manner consistent with the broad inventive concepts disclosed herein.

What is claimed is:

1. A method of operating a USB power-delivery source device comprising:
    communicating with a second USB power-delivery device, said communicating including receiving messages from the second USB power-delivery device; and
    if no response is received from the second USB power-delivery device for a predetermined duration, sending one or more source capabilities messages by the USB source power-delivery device;
    wherein, after sending a predetermined number of source capabilities messages, if no response is received from the second USB power-delivery device, sending by the USB power-delivery source device at least one reset message; and
    wherein, after sending a predetermined number of reset messages, if no response is received from the second USB power-delivery device, entering a device sleep mode by the USB power-delivery source device, wherein signal-receiving functionality of the USB power-delivery source device is turned off.

2. The method of claim 1 wherein each of the source capabilities messages contain information regarding the device's capabilities as a USB power-delivery source device.

3. The method of claim 1 wherein the USB power-delivery source device comprises a frequency shift keying (FSK) receiver and wherein turning off signal-receiving functionality of the USB power-delivery source device comprises turning off the FSK receiver.

4. An apparatus, comprising:
    a receiver configured to couple to a uniform serial bus (USB) interface; and
    a controller coupled to the receiver and configured to:
        transmit up to a first predetermined number of source capabilities messages across the USB interface as long as no response is received via the USB interface for a first time period after transmission of each source capabilities message, wherein each source capabilities message includes a power delivery object that includes a plurality of parameters that collectively identify a type of power supply;
        determine that no response has been received for any of the first predetermined number of source capabilities message and thereby cause the receiver to be disabled for a second time period that is longer than the first time period.

5. The apparatus of claim 4, wherein each source capabilities message includes a plurality of power delivery objects, each power delivery object including plurality of parameters that collectively identify a type of power supply that is different than the type of power supply identified they plurality of parameters of other power delivery objects.

6. The apparatus of claim 4, wherein the controller is configured to:
    after transmission of the predetermined number of source capabilities messages, if no response is received via the USB interface, transmit up to a second predetermined number of reset messages as long as no responses are received via the USB interface; and
    cause the receiver to be disabled for the second time period as a result of transmission of the first predetermined number of source capabilities messages and the second predetermined number of reset messages.

7. The apparatus of claim 4, wherein the receiver comprises a first type of receiver, and wherein the apparatus further comprises a second type of receiver, and wherein the controller causes both the first and second types of receivers to be disabled.

8. The apparatus of claim 7, wherein the second type of receiver is a squelch receiver.

9. The apparatus of claim 4, wherein the first predetermined number of source capabilities messages is three.

\* \* \* \* \*